United States Patent [19]

Ukihashi et al.

[11] 4,138,373

[45] Feb. 6, 1979

[54] PROCESS FOR PRODUCING FLUORINATED COPOLYMER HAVING ION-EXCHANGE GROUPS

[75] Inventors: Hiroshi Ukihashi, Tokyo; Tatsuro Asawa, Yokohama; Masaaki Yamabe, Machida; Haruhisa Miyake, Yokohama, all of Japan

[73] Assignee: Asahi Glass Company Ltd., Tokyo, Japan

[21] Appl. No.: 837,225

[22] Filed: Sep. 27, 1977

[30] Foreign Application Priority Data

Oct. 15, 1976 [JP] Japan .............................. 51-122894

[51] Int. Cl.$^2$ ...................... C08F 214/18; C08F 2/18
[52] U.S. Cl. ...................................... 521/38; 526/247; 526/18
[58] Field of Search ................ 260/2.2 R; 526/242, 526/245, 247, 248

[56] References Cited

U.S. PATENT DOCUMENTS 3,654,245   4/1972   Kometani et al. .................. 526/245

*Primary Examiner*—Joseph L. Schafer
*Assistant Examiner*—Peter F. Kulkosky
*Attorney, Agent, or Firm*—Oblon, Fisher, Spivak, McClelland & Maier

[57] ABSTRACT

A fluorinated copolymer having 1 to 50 mole % of a component having functional group of carboxylic acid group or a group which can be converted to carboxylic acid group, is produced by copolymerizing a fluorinated ethylenic unsaturated monomer and a functional monomer having the functional group in the presence of a polymerization initiator source in an aqueous medium under the pressure of higher than 7 kg/cm$^2$ whereby the copolymer having high molecular weight ($T_Q$ of higher than 150° C.) and an ion exchange capacity of 0.5 to 4 meq/g dry polymer is produced.

7 Claims, No Drawings

PROCESS FOR PRODUCING FLUORINATED COPOLYMER HAVING ION-EXCHANGE GROUPS

BACKGROUND OF THE INVENTION

1. Field of the Invention:

The present invention relates to a process for producing a fluorinated copolymer having ion-exchange groups. More particularly, it relates to a process for producing a fluorinated copolymer having carboxylic acid type cation exchange groups which is effectively used as an ion exchange membrane in an electrolysis of an aqueous solution of electrolytes, by a copolymerization in an aqueous medium.

2. Description of Prior Art:

It has been known to produce sodium hydroxide in a cathode compartment by partitioning the anode compartment and the cathode compartment and feeding an aqueous solution of sodium chloride etc. into the anode compartment to electrolyze it by a diaphragm electrolysis.

Recently, it has been proposed to use a cation exchange membrane which does not substantially pass the electrolyte and selectively passes alkali metal ions instead of an asbestos diaphragm.

It has been especially proposed to use a fluorinated cation exchange membrane having high alkali resistance and chlorine resistance.

For example, it has been known to use cation exchange membranes of fluorinated polymers having carboxylic acid groups or sulfonic acid groups as the ion exchange group. (Japanese Unexamined Patent Publication Nos. 37395/1973 and 120492/1975).

It has been found that when the cation exchange membrane of the carboxylic acid type fluorinated copolymer is used in a diaphragm electrolysis of an aqueous solution of alkali metal chloride, an alkali metal hydroxide having high purity can be obtained and the operation in high current efficiency and high current density can be attained and high concentration of an alkali metal hydroxide can be obtained in the cathode compartment.

The excellent characteristic has been found that higher than 90% of the current efficiency can be given even though the concentration of sodium hydroxide is higher than 40%.

However, there has not been found any proposal to advantageously produce the fluorinated polymers having carboxylic acid type cation exchange groups.

The inventors have found that in order to attain the above-mentioned high electrolytic characteristics, it is important to provide an ion exchange capacity of the fluorinated polymer having ion-exchange groups in a range of 0.5 to 4 meq/g dry polymer, preferably 0.8 to 3 meq/g dry polymer, especially 1.0 to 2.2 meq/g dry polymer (meq = milli-equivalent) and to provide higher molecular weight.

When the ion exchange capacity is increased, the molecular weight of the fluorinated polymer has been lowered whereby the mechanical strength (such as ultimate tensile strength and ultimate elongation) of a membrane thereof is lowered.

The inventors have studied, given the above-mentioned knowledge, to provide an advantageous process for producing a fluorinated polymer having carboxylic acid type cation exchange groups especially a fluorinated polymer having high molecular weight and high ion exchange capacity.

As the result, it has been found that a desired fluorinated polymer can be obtained by copolymerizing a fluorinated olefin and a fluorinated monomer having carboxylic acid type functional group in an aqueous medium under specific conditions.

SUMMARY OF THE INVENTION

It is an object of the present invention to provide a process for producing a fluorinated copolymer having ion exchange groups which has high ion exchange capacity and high molecular weight.

Another object of the invention is to provide a process for smoothly producing a fluorinated copolymer with a high copolymerizing reaction velocity.

The other object of the invention is to provide a fluorinated cation exchange membrane which can be used as a diaphragm for producing an alkali metal hydroxide having high concentration in high purity under high current efficiency in the electrolysis of an alkali metal chloride.

These objects of the invention can be attained by providing a process for producing a fluorinated copolymer having ion-exchange groups which has 1 to 50 mole % of a component having a functional group of carboxylic acid group or a group which can be converted to carboxylic acid group, by copolymerizing a fluorinated ethylenic unsaturated monomer and a functional monomer having the functional group, in the presence of a polymerization initiator source in an aqueous medium wherein the copolymerization is carried out in less than 20 wt. parts of the aqueous medium per 1 wt. part of the functional monomer under a pressure of higher than 7 kg/cm² whereby the copolymer having the below defined $T_Q$ of higher than 150° C. and an ion exchange capacity of 0.5 to 4 meq/g dry polymer (meq = milli-equivalent) is produced.

DETAILED DESCRIPTION OF THE PREFERRED EMBODIMENTS:

The term $T_Q$ is defined as follows.

The term $T_Q$ is related to the molecular weight of the copolymer and is the temperature that results in a melt volumetric flow rate of 100 mm³/second. The volumetric melt flow rate is the rate of the molten copolymer flowed out from an orifice having a diameter of 1 mm and a length of 2 mm at a specific temperature under a pressure of 30 kg/cm² and is shown by units of mm³/second.

In the process of the invention, it is important to use a functional monomer having as a functional group a carboxylic acid or a group which can be converted to a carboxylic acid group.

The carboxylic acid type functional monomers (I) are preferably fluorovinyl compounds from the viewpoints of the chlorine resistance and oxidation resistance of the resulting copolymer.

Suitable functional monomers are fluorovinyl compounds having the formula

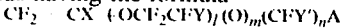

wherein l is 0 to 3; m is 0 to 1; n is 0 to 12; X represents —F or —CF₃; Y and Y' respectively represent —F or a $C_{1-10}$ perfluoroalkyl group; A represents —CN, —COF, —COOH, —COOR₁, —COOM or —COONR₂R₃; R₁ represents a $C_{1-10}$ alkyl group; R₂ and R₃ respectively represent —H or $R_1$; M represents an alkali metal atom or a quaternary ammonium group.

From the viewpoints of the property and availability, it is preferable to use the fluorovinyl compound having the above-mentioned formula wherein X is —F; Y is —$CF_3$; Y' is —F; l is 0 to 1; m is 0 to 1; n is 0 to 8.

From the viewpoint of copolymerization reaction, it is preferable to use the fluorovinyl compound having the formula wherein A is —COF or —$COOR_1$ and $R_1$ is a $C_{1-5}$ alkyl group.

Typical fluorovinyl compounds include $CF_2 = CFO(CF_2)_{1-8}COOCH_3$,
$CF_2 = CFO(CF_2)_{1-8}COF$,
$CF_2 = CFO(CF_2)_{1-8}COOC_2H_5$,
$CF_2 = CF(CF_2)_{0-8}COOCH_3$,
$CF_2 = CFOCF_2CF(CF_3)OCF_2CF_2CF_2COOCH_3$, and
$CF_2 = CFOCF_2CF(CF_3)OCF_2CF_2CF_2COF$.

Suitable fluorinated ethylenic unsaturated monomers (II) include $C_2F_4$, $C_2F_3Cl$, $C_3F_6$, $C_2HF_3$, $C_2H_2F_2$ and $C_2H_3F$.

The fluorinated ethylenic unsaturated monomers are preferably fluorinated olefins having the formula $$CF_2 = CZZ'$$

wherein Z and Z' respectively represent —F, —Cl, —H or —$CF_3$. It is preferable to use a perfluoroolefin especially tetrafluoroethylene.

In the process of the invention, it is possible to use two or more types of the functional monomers (I) and the ethylenic unsaturated monomers (II), respectively.

It is also possible to add one or more other monomer such as an olefin compound (III) having the formula $$CH_2 = CR_4R_5$$

wherein $R_4$ and $R_5$ respectively represent —H, $C_{1-8}$ alkyl group or an aromatic ring; a fluorovinyl ether having the formula $$CF_2 = CFOR_f$$

wherein $R_f$ represents a $C_{1-10}$ perfluoroalkyl group; a divinyl monomer e.g. $CF_2 = CF—CF = CF_2$ and $CF_2 = CFO(CF_2)_{1-4}OCF = CF_2$ and the other functional monomers e.g. a sulfonic acid type functional monomer.

Suitable olefins (III) include ethylene, propylene, butene-1, isobutylene, styrene, α-methyl styrene, pentene-1, hexene-1, heptene-1, 3-methyl butene-1, 4-methyl pentene-1, etc.

From the viewpoints of the manufacture and property of the resulting copolymer, it is especially preferable to use ethylene, propylene, isobutylene, etc.

When a divinyl monomer or the like is added, the resulting copolymer is crosslinkable and the mechanical strength of the membrane made of the crosslinked copolymer is improved.

The ratio of the functional monomer (I), the fluorinated olefin (II), and the olefin compound (III) and the other component are important because it relates to the characteristics of a cation exchange membrane for an electrolytic cell.

The content of the functional monomer (I) is important and directly relates to the ion exchange capacity and is preferably 1 to 50 mole %, preferably 3 to 35 mole %, especially 5 to 30 mole %.

When the content of the functional monomer (I) is too high, the resulting cation exchange membrane has disadvantageously low mechanical strength and low ion exchangeability caused by the increase of the water content.

When the content of the functional monomer (I) is too low, the ion exchangeable function is disadvantageously negligible.

The fluorinated olefin (II), the olefin compound (III) and the other compound are the residual components in the copolymer. The content of the olefin (III) is important and relates to the electrical and mechanical properties and the chlorine resistance of the resulting cation exchange membrane.

Accordingly, when the olefin compound (III) is added, the molar ratio of the olefin compound (III) to the fluorinated olefin (II) is preferably 5/95 to 70/30, especially 10/90 to 60/40.

When the fluorovinyl ether or the divinyl ether is added, it is preferable to give a content of the fluorovinyl ether or the divinyl ether of less than 30 mole % preferably 2 to 20 mole % in the copolymer.

The ion exchange capacity of the copolymer can be in a range of 0.5 to 4 meq/g dry polymer. It is a special characteristic that even though the ion exchange capacity is large, the molecular weight of the resulting copolymer can be high whereby the mechanical strength and durability of the copolymer can be high enough.

The ion exchange capacity is dependent upon the type of the copolymer in the above-mentioned range and is preferably 0.8 to 3 meq/g dry polymer, especially 1.0 to 2.2 meq/g dry polymer, from the viewpoints of the mechanical and electrochemical properties as the cation exchange membrane.

The molecular weight of the copolymer produced by the process of the invention is important and relates to the mechanical properties and the fabricability of the cation exchange membrane.

When it is shown by the value of $T_Q$, it is usual to have a $T_Q$ higher than 150° C. preferably 170 to 340° C. especially about 180 to 300° C.

In the process of the invention, it is important to carry out the copolymerization of the functional monomer and the fluorinated olefin using a specific amount of an aqueous medium.

It is important to carry out the polymerization by using less than 20 wt. parts preferably less than 10 wt. parts such as 20 to 0.1 wt. parts preferably 10 to 0.2 wt. parts especially 7 to 0.5 wt. parts per 1 wt. part of the functional monomer.

When the amount of the aqueous medium is too much, the reaction velocity in the copolymerization is remarkably low whereby it is difficult to obtain high yield of the copolymer. Sometimes, no copolymer is obtained. When the amount of the aqueous medium is too much, it is difficult to produce a copolymer having high molecular weight when the copolymer having high ion exchange capacity is produced.

Moreover, the following disadvantages are found when a large amount of the aqueous medium is used. For example, a large size of the reactor is required and disadvantageous operations such as complicated recovery of the copolymer are required.

In the process of the invention, it is important to carry out the copolymerization under the pressure of higher than 7 kg/cm². When the pressure for the copolymerization is too low, it is difficult to maintain the reaction velocity for the copolymerization in enough high level and to produce the copolymer having high molecular weight. When the pressure for copolymerization is too low, the ion exchange capcity of the resulting copolymer is too high whereby the mechanical strength and the ion exchangeability are lowered by the increase of the water content.

The pressure for copolymerization is preferably selected from the range of less than 50 kg/cm², from the viewpoints of the reactor and the operations in the industrial process. Even though higher pressure for the copolymerization can be employed, the effect of the invention is not proportionally improved by increasing the pressure. Accordingly, the pressure for copolymerization is usually in a range of 7 to 50 kg/cm² preferably 9 to 30 kg/cm².

In the copolymerization of the invention, the reaction condition, the other condition and the operation are not specifically limited and can be selected from wide ranges. For example, the optimum reaction temperature for copolymerization can be selected depending upon the type of the polymerization initiator source, or the molar ratio of the components in the reaction, etc. Usually, a high or low temperature is not advantageous in the industrial process and accordingly, it is selected from the range of 20 to 90° C. preferably about 30 to 80° C.

Thus, it is preferable to select the polymerization initiator source when imparts high activity at the reaction temperature in the process of the invention.

It is possible to use ionized high energy radiation at room temperature however, it is preferable to use an azo compound or a peroxy compound in the industrial process.

Suitable polymerization initiator sources are compounds having high activity at about 20 to 90° C. under the reaction pressure for copolymerization and include diacyl peroxides such as disuccinic acid peroxide, benzoyl peroxide, lauroyl peroxide, dipentafluoropropionyl peroxide; azo compounds such as 2,2'-azobis(2-amidinopropane) hydrochloride, 4,4'-azobis(4-cyanovalerianic acid, azobisisobutyronitrile, peroxy esters such as t-butyl peroxyisobutylate, t-butyl peroxy pivarate; peroxydicarbonates such as diisopropyl peroxy dicarbonate, di-2-ethylhexyl peroxy dicarbonate; hydroperoxides such as diisopropylbenzene hydroperoxide; inorganic peroxides such as potassium peroxide, ammonium peroxide etc. and redox type compositions thereof.

In the process of the invention, the concentration of the polymerization initiator is usually in a range of 0.0001 to 3 wt. % preferably 0.001 to 2 wt. % to total monomers.

The molecular weight of the resulting copolymer can be increased and high ion exchange capacity can be kept by decreasing the concentration of the polymerization initiator. When the concentration of the polymerization initiator is too high, the molecular weight of the copolymer is decreased to cause disadvantages for the production of the copolymer having high ion exchange capacity and high molecular weight.

The copolymerization of the invention is usually carried out as follows.

In an autoclave, the carboxylic acid type functional monomer and the polymerization initiator and the aqueous medium are charged. The oxygen in the autoclave is purged, it is kept at a desired temperature, and the fluorinated olefin is introduced to the specific pressure to carry out the reaction. After the reaction, the unreacted fluorinated olefin is purged and the copolymer is separated by precipitating it by adding the slurry of the copolymer into hexane, etc.

It is possible to add the other components added in a conventional polymerization in an aqueous medium such as surfactants, dispersing agents, buffer agents, molecular weight controlling agents, etc. It is also possible to add inert organic solvents such as saturated fluoro- or fluorochloro-hydrocarbons known as Freon type solvents which do not inhibit the copolymerization of the fluorinated olefin with the specific functional monomer and which have less chain transferring characteristic.

In the process of the invention, it is preferable to carry out the copolymerization under controlling the concentration of the resulting copolymer to less than 40 wt. % preferably less than 30 wt. %. When the concentration is too high, the disadvantges of high load for stirring, difficulty of heat removal and insufficient absorption and diffusion of the fluorinted olefin gas are found.

The copolymer of the invention can be processed to form a membrane by desired methods. For example, the functional group is converted to carboxylic acid group by the hydrolysis, if necessary. The hydrolysis can be carried out before or after the fabrication of a membrane. It is usually to hydrolyze it after the fabrication of a membrane.

The fabrication of a membrane can be carried out by various methods such as a heat melt molding method, a latex forming method, a casting method using a solvent solution of the copolymer and other known methods.

The cation exchange membranes made of the copolymers of the invention have excellent characteristics and can be used in various fields, various objects and various usages. For example, they can be preferably used in the field in which the anticorrosion is required, as a diaphragm for a diffusion dialysis, an electrolytic reduction and a fuel cell.

When it is used as a cation selective diaphragm for an electrolysis of alkali metal compound, high characteristics which could not be attained by using the conventional cation exchange membrane can be imparted.

Thus, in the case of the two compartment cell wherein an anode compartment and a cathode compartment are formed by partitioning the anode and the cathode with the cation exchange membrane made of the fluorinated copolymer of the invention, and an aqueous solution of an alkali metal chloride is fed into the anode compartment to electrolyze it to obtain an alkali hydroxide from the cathode compartment, it is possible to produce sodium hydroxide having high concentration of higher than 40% in high current efficiency of higher than 90% by electrolyzing an aqueous solution of sodium chloride having a concentration higher than 2N under a current density of 5 to 50A/dm².

It is also possible to attain the electrolysis in low cell voltage of lower than 4.5 volts.

A further understanding can be obtained by reference to certain specific examples which are provided herein for purposes of illustration only and are not intended to be limiting unless otherwise specified.

In the examples, an ion exchange capacity of a cation exchange membrane was measured as follows.

A H-type cation exchange membrane was immersed into 1N-HCl at 60° C. for 5 hours to completely convert it to H-type membrane, and then the membrane was washed with water so as to be free of HCl. Then, 0.5 g of the H-type membrane was immersed at room temperature for 2 days into a solution prepared by adding 25 ml of water to 25 ml of 0.1N-NaOH. Then, the membrane was taken out and the amount of NaOH in the solution was measured by a back titration with 0.1N-HCl.

In the examples, the air purge was carried out in vacuum under cooling with liquid nitrogen.

EXAMPLE 1 in a 0.1 liter autoclave made of stainless steel, the following components were charged.
Pure water; 60 g
Ammonium persulfate; 120 mg
$Na_2HSO_3$; 18 mg
$NaHPO_4.12H_2O$; 420 mg
$C_7H_{15}COONH_4$; 300 mg In the mixture, 25 g of $CF_2 = CFO(CF_2)_3COOCH_3$ was charged and air was purged and the mixture was heated at 70° C and then, tetrafluoroethylene was charged to 19.3 kg/cm² to perform the reaction. During the reaction, tetrafluoroethylene was continuously fed so as to maintain the reaction pressure at 19.3 kg/cm².

After the reaction for 2 hours, 24.2 wt. % of latex was obtained. The latex contained 19.1 g of the copolymer. The copolymer had $T_Q$ of 270° C and was press-molded at 270° C and was hydrolyzed to obtain a cation exchange membrane having an ion exchange capacity of 1.47 meq/g polymer.

Two compartment type electrolytic cell was prepared by partitioning an anode compartment and a cathode compartment with the cation exchange membrane and using an anode made of titanium coated with rhodium and a cathode made of stainless steel with a space of electrodes of 2.2 cm and an effective area of the membrane of 25 cm². The electrolysis of sodium chloride was carried out under the following condition.

The anode compartment was filled with 4N-NaCl aq. solution and the cathode compartment was filled with 8N-NaOH aq. solution. The electrolysis was carried out by feeding respectively 4N-NaCl aq. solution at a rate of 150 cc/hour into the anode compartment and 0.1N-NaOH aq. solution was fed into the cathode compartment under the current density of 20A/dm² at 92° C. of the temperature of the solution in the pH of 3 of the anolyte.

The aqueous solution of sodium chloride was overflowed from the anode compartment and on the other hand, an aqueous solution of sodium hydroxide overflowed from the cathode compartment was collected.

The current efficiency was measured from the amount of the resulting sodium hydroxide. As the results, 40 wt. % of aqueous solution of sodium hydroxide was obtained in the current efficiency of 92%. The cell voltage was 3.9 volts and the cation exchange membrane had stable characteristics for a long time.

EXAMPLE 2

The process of the Example 1 was repeated except using $CF_2 = CFO(CF_2)_4COOCH_3$ instead of $CF_2 = CFO(CF_2)_3COOCH_3$, and charging tetrafluoroethylene to the pressure of 17.5 kg/cm² and maintaining the pressure of 17.5 kg/cm² during the reaction.

After the reaction for 2 hours, 21.5 wt. % of the latex was obtained. The latex contained 16.4 g of the copolymer. The copolymer had $T_Q$ of 240° C. and was press-molded at 240° C. and was hydrolyzed to obtain a cation exchange membrane having an ion exchange capacity of 1.55 meq/g polymer and a thickness of 300μ.

The electrolysis of sodium chloride was repeated by the process of Example 1 except using the cation exchange membrane to obtain 40 wt. % aqueous solution of sodium hydroxide in the current efficiency of 92% and the cell voltage of 3.7 volts.

EXAMPLE 3

In a 0.1 liter autoclave made of stainless steel, 30 g of pure water, 30 g of $CF_2 = CFO(CF_2)_3COOCH_3$ and 20 g of

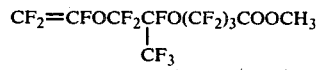

and 10 mg of azobisisobutyronitrile were charged, and air was purged and the mixture was heated at 70° C. and then, tetrafluoroethylene was charged at 19.5 kg/cm² to perform the reaction. During the reaction, tetrafluoroethylene was continuously fed so as to maintain the reaction pressure to 19.5 kg/cm².

After the reaction for 7.0 hours, 11.6 g of the copolymer was obtained. The copolymer had $T_Q$ of 190° C. and was press-molded at 190° C. and hydrolyzed to obtain a cation exchange membrane having an ion exchange membrane having an ion exchange capacity of 1.35 meq/g polymer and a thickness of 300 μ.

The electrolysis of sodium chloride was repeated by the process of Example 1 except using the cation exchange membrane to obtain 40 wt. % aqueous solution of sodium hydroxide with a current efficiency of 91% and a cell voltage of 4.0 volts.

EXAMPLe 4

In a 0.1 liter autoclave made of stainless steel, 60 g of pure water, 90 mg of di-2-ethylhexylperoxydicarbonate, 60 mg of methyl cellulose and 25 g of $CF_2 = CFO(CF_2)_3 COOCH_3$ were charged, air was purged and the mixture was heated at 50° C and then, tetrafluoroethylene was charged at 13.7 kg/cm² to perform the reaction. During the reaction, tetrafluoroethylene was continuously fed so as to maintain the reaction pressure to 13.7 kg/cm².

After the reaction for 4.5 hours, 9.2 g of the copolymer was obtained. The copolymer had $T_Q$ of 250° C. and was press-molded at 250° C. and hydrolyzed to obtain a cation exchange membrane having an ion exchange capacity of 1.46 meq/g polymer and a thickness of 300 μ.

The electrolysis of sodium chloride was repeated by the process of Example 1 except using the cation exchange membrane to obtain 40 wt. % aqueous solution of sodium hydroxide with a current efficiency of 93% and a cell voltage of 3.8 volts.

EXAMPLE 5

The process of Example 3 was repeated except charging tetrafluoroethylene at 50° C. at a pressure of 15.0 kg/cm² and continously feeding a mixture of tetrafluoroethylene and ethylene at a mole ratio of 90 to 10 to maintain the pressure of 15.0 kg/cm² during the reaction.

After the reaction for 5 hours, 14.6 g of the copolymer was obtained. The copolymer had $T_Q$ of 270° C. and was press-molded at 270° C. and hydrolyzed to obtain a cation exchange membrane having an ion exchange capacity of 1.41 meq/g polymer and a thickness of 300 μ.

The electrolysis of sodium chloride was repeated by the process of Example 1 except using the cation exchange membrane to obtain 40 wt. % aqueous solution of sodium hydroxide with a current efficiency of 93% and a cell voltage of 3.9 volts.

Reference 1

The process of Example 1 was repeated except maintaining a tetrafluoroethylene pressure of 6.0 kg/cm$^2$ during the reaction. After the reaction for 6 hours, 3.6 wt. % of a latex was obtained. The latex contained 3.7 g of the copolymer. The copolymer had $T_Q$ of 90° C. When the copolymer was press-molded, a film having self-sustaining characteristics could not be obtained.

Reference 2

The process of Example 3 was repeated except using 2.0 g $CF_2 = CFO(CF_2)_3COOCH_3$ and maintaining a pressure of 5.0 kg/cm$^2$. However, after the reaction for 10 hours, a copolymer was not substantially obtained.

What is claimed is:

1. In a process for producing a cation exchange group-containing fluorinated copolymer having a high molecular weight and a high ion-exchange capacity which has a 1 to 50 mol % of a component having as a functional group a carboxylic acid group or a group which can be converted to a carboxylic acid group by copolymerizing a fluorinated ethylenic unsaturated monomer and a functional monomer having said functional group and which is represented by the formula $$CF_2 = CX + OCF_2CFY \overline{)_l} O + CFY' \overline{)_n} A$$

wherein l is 0 to 3; n is 0 to 12; X represents —F or —CF$_3$; Y and Y' respectively represent —F or a C$_{1-10}$ perfluoro alkyl group; A represents —CN, —COF, —COOH, —COOR$_1$, —COOM or —COONR$_2$R$_3$; R$_1$ represents a C$_{1-10}$ alkyl group; R$_2$ and R$_3$ respectively represent —H or R$_1$; M represents an alkali metal atom or a quaternary ammonium group; in the presence of a polymerization initiator source in an aqueous medium, the improvement wherein the copolymerization is carried out in less than 20 wt. parts of the aqueous medium per 1 part of said functional monomer under a pressure higher than 7 kg/cm$^2$ whereby a copolymer having a $T_Q$ of higher than 150° C. and an ion exchange capacity of 0.5 to 4 meq/g dry polymer is recovered.

2. A process according to claim 1, wherein the fluorinated ethylenic unsaturated monomer is a fluorinated olefin having the formula $$CF_2 = CZZ'$$

wherein Z and Z' respectively represent —F, —Cl, —H or —CF$_3$.

3. A process according to claim 1, wherein the fluorovinyl compound is the compound having the formula $$CF_2 = CF + OCF_2CF \overline{)_l} O + CF_2 \overline{)_n} A$$
$$\phantom{CF_2 = CF + OCF_2C}|$$
$$\phantom{CF_2 = CF + OCF_2C}CF_3$$

wherein l is 0 to 1; n is 0 to 8; A represents —COF or —COOR$_1$ and R$_1$ represents a lower alkyl group.

4. A process according to claim 2, wherein the fluorinated ethylenic unsaturated monomer is tetrafluoroethylene.

5. A process according to claim 1, wherein the reaction temperature for copolymerization is in a range of 20 to 90° C.

6. A process according to claim 1, wherein the copolymerization is carried out under controlling the concentration of the copolymer in the slurry of the resulting copolymer to lower than 40 wt. %.

7. A cation exchange-group-containing fluorinated copolymer obtained by the process of claim 1.

* * * * *